(12) United States Patent
Spirig (10) Patent No.: US 6,561,409 B1
(45) Date of Patent: May 13, 2003

(54) HEAT SHIELD FOR SOLDERING DEVICE

(76) Inventor: Ernst Spirig, Hohlweg 1, P.O. Box 1140, Rapperswil, CH-8640 (CH)

( * ) Notice: Subject to any disclaimer, the term of this patent is extended or adjusted under 35 U.S.C. 154(b) by 0 days.

(21) Appl. No.: 09/787,585

(22) PCT Filed: Sep. 21, 1999

(86) PCT No.: PCT/IB99/01600
§ 371 (c)(1),
(2), (4) Date: May 22, 2001

(87) PCT Pub. No.: WO00/16941
PCT Pub. Date: Mar. 30, 2000

(30) Foreign Application Priority Data

Sep. 21, 1998 (GB) .............................................. 9820530

(51) Int. Cl.$^7$ ................................................. B23K 5/22
(52) U.S. Cl. ...................................................... 228/59
(58) Field of Search ......................... 228/59; 248/117.2, 248/514, 176, 154; 219/242, 70, 138, 139; 211/70.6

(56) References Cited

U.S. PATENT DOCUMENTS

| 4,161,643 | A | * | 7/1979 | Martin, Jr. et al. |
| 5,141,189 | A | * | 8/1992 | Andrew |
| 6,205,088 | B1 | * | 3/2001 | Stempien |

* cited by examiner

Primary Examiner—Tom Dunn
Assistant Examiner—Jonathan Johnson
(74) Attorney, Agent, or Firm—Daly, Crowley & Mofford, LLP (57) ABSTRACT

A heat shield device suitable for use with a soldering device comprises a heat shield and means for moving the heat shield to and from the shielding position in which it shields a target area from a heat source, wherein the movement of the heat shield is mechanically linked to a movement of the heat source in relation to the target area. This device provides the advantage that the shielding of the heat source can be automatically synchronized with the movement of the heat source away from the target, the heat shield is secured with respect to the heat source by means of a resilient member which provides a biasing force to bias the heat shield away from the shielding position.

8 Claims, 9 Drawing Sheets

HEAT SHIELD FOR SOLDERING DEVICE

The invention relates to a heat shield device suitable for use with a soldering device.

A soldering device is known from EP 0546781, which uses cylinders to transport gas through a hollow stem to produce a flame at an orifice (flame delivery cylinder) to be used as the heat source, or to feed the solder wire through the hollow stem of a second cylinder (wire delivery cylinder) to be melted by the heat energy supplied by the flame to the spot where the soldering is to take place.

The hollow stem cylinder based flame delivery system offers great advantages in delivering the flame to spots with restricted access and in the simplicity of the flame transport from a "Home" (or standby) position to the "Work" position.

The flame has by its nature an elongated shape in the direction of the flame nozzle and accordingly its maximum heat is in the direction of the cylinder stem movement. That means that the travel distance between the cylinder Home position and Work position must be physically long enough to not have in the standby position a constant heat influx (obviously reduced as distance increases) on the job area.

The flame is preferably generated using a mixture of hydrogen and oxygen. This gas mixture may be made by electrolysis from water in which case the mixture is 2 parts hydrogen to 1 part oxygen. Flames of this kind have almost no side heat radiation but an almost needle sized elongated heat shape.

The distance between Home and Work positions must be, as an example for a nozzle with inner diameter 0.8 mm and a gas pressure of 100 mBar, around 300 mm in order to provide adequate heat isolation of the job area in the Home position. At that distance the heat is still so intensive that a hand palm must be quickly withdrawn to avoid burns. On the other side it is possible to approach the flame shape near the nozzle to almost a few millimetres before some heat is sensed.

This flame behaviour obviously provides advantages for working in tight spaces as long as the flame can be retracted sufficiently after the job is done.

The long travel distance required for heat isolation has several negative technical points of which the major ones are listed here:

It will take longer for the flame to travel from Home to Work, therefore adding additional time to the cycle time needed to perform a soldering task, Cylinders with longer stroke are more costly, Design space in an assembly system needed in the axial direction of the cylinder is long, Cylinders with longer stroke tend to have the following problems:
a less stiff hollow stem,
pointing less precise to target,
end of stem tends to vibrate relative to the target on stopping in the Work position.

The stem thickness could be increased to give a higher stability. This again makes the cylinder heavier, and requires a wider design diameter, therefore reducing the access to tight spots.

Solutions for the heat isolation problem have been found and are applied in practice, but with a relatively substantial additional use of mechanical parts and movement controls as described below.

There exist four basic solutions:

1. Switch off the flame when the flame cylinder arrives back in Home position. Cutting the gas flow by closing a gas valve in the gas flow path can be done, thereby extinguishing the flame. For the next operation the flame will have to be reignited. This means an automated (electric/electronic) ignition device properly sequenced with the valve ON (gas flow) function and an eventual flame check before operating the task (since reignition could be unsuccessful at the first attempt). There is a control oscillation for the generator gas flow controller between OFF (no gas production) and ON (gas production adjusted automatically to fit the gas rate needed to establish the gas pressure). The constant on/off of the flame will place additional thermal wear on the nozzle outlet orifice. Each time the flame pops out the high temperature flame will fall on the nozzle outlet orifice and heat it there. A hydrogen/oxygen flame with properly adjusted gas pressure will not heat the nozzle end as long as the flame is on.

2. Slide a heat shielding mask from the side into the flame heat direction path, thereby shielding the target area from the heat source. There could be provided an additional properly timed cylinder with a mounted heat shield. However, the shield cylinder would have to be synchronized with the movement of the flame cylinder, and collisions could occur.

3. Move the flame cylinder axis, so the flame direction points to another heat absorbing area. eg a sort of chimney to diffuse the heat. The flame cylinder would have to be mounted with a bearing at one end so it can swivel around that point, and could be moved using a pivot cylinder.

4. Move the job target out of the flame heat direction.

The preferred embodiment of the present invention provides a heat shield device comprising a heat shield and means for moving the heat shield to and from a shielding position in which it shields, in use, a target area from a heat source, wherein the movement of the heat shield is mechanically linked to a movement of the heat source away from and towards the target area.

The means for moving the heat shield preferably include means for providing a biassing force.

The means for providing the biassing force preferably bias the heat shield away from the shielding position. The biassing means may comprise a resilient member by which the heat shield may be secured with respect to the heat source. Alternatively the heat shield may be pivotably mounted with respect to the heat source, the pivoting action being influenced by spring means, for example.

Additionally or alternatively, the means for moving the heat shield may comprise a cam surface provided on the heat shield device which cooperates with a surface which is fixed with respect to the heat source. Preferably said cooperating surfaces provide a camming action to move the heat shield into the shielding position.

The invention also provides a heat delivery device provided with a heat source and a heat shield device as described above. In the case of a heat shield device provided with a cam surface, the heat delivery device preferably has a cooperating surface in the form of a protruding shoulder. Preferably the cam surface on the heat shield device faces the workpiece and the other cam surface faces away from the workpiece.

The device according to a preferred embodiment of the invention is a very simple low cost solution to the problem of isolating the target area from the heat source. It is particularly advantageous that the shielding of the heat source is automatically synchronised with the movement of the heat source away from the target, without the need for external control systems.

An embodiment of the invention will now be described by way of example with reference to the accompanying drawings in which like numerals refer to like parts throughout and in which:

Figure 1A:
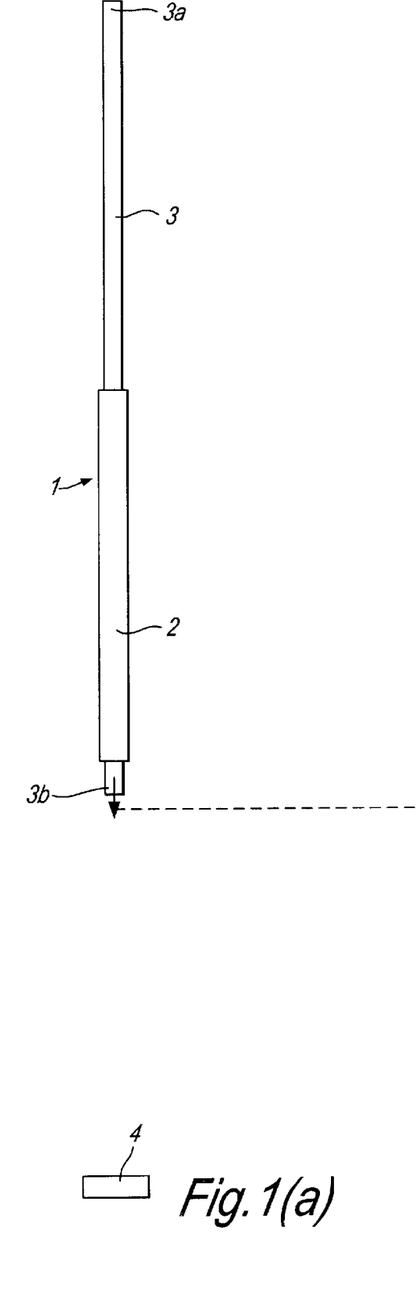
FIGS. 1 to 5 illustrate the aforedescribed existing methods of protecting an object from the heat source of a soldering device when soldering is not taking place.
Figure 1B:
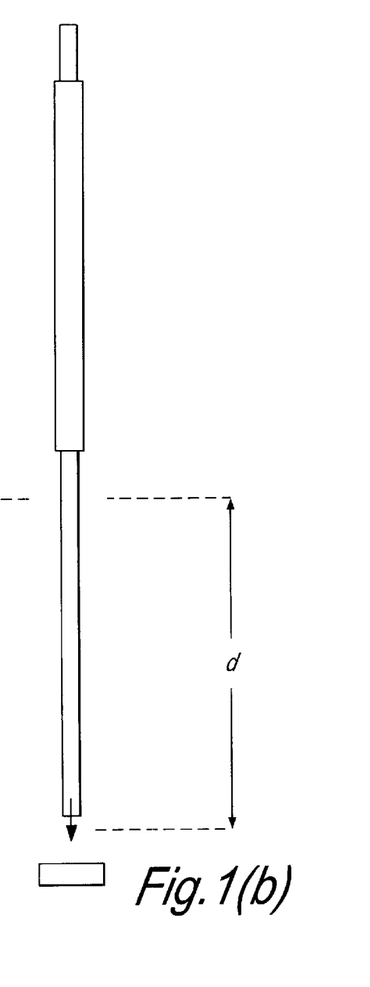

FIG. 1 illustrates a soldering device 1 comprising a flame cylinder 2 and a stem 3. A flame is produced at one end 3b of the stem, and gas is introduced at the other end 3a. FIGS. 1(a) and 1(b) illustrate the method of isolating a target object 4 from the heat source when soldering is not taking place, by moving the heat source a sufficient distance away from the target object 4. FIG. 1(a) illustrates the "Home" position, where the target is protected from the heat source, and FIG. 1(b) illustrates the "Work" position, where the target is exposed to the heat source, and soldering may take place.

If the flame remains switched on in the Home position, distance d must be relatively large as described previously. If however, the flame is switched off when the device is in the Home position, distance d may be reduced, but the continual extinguishing and reignition of the flame has associated disadvantages, also described above.

Figure 2:
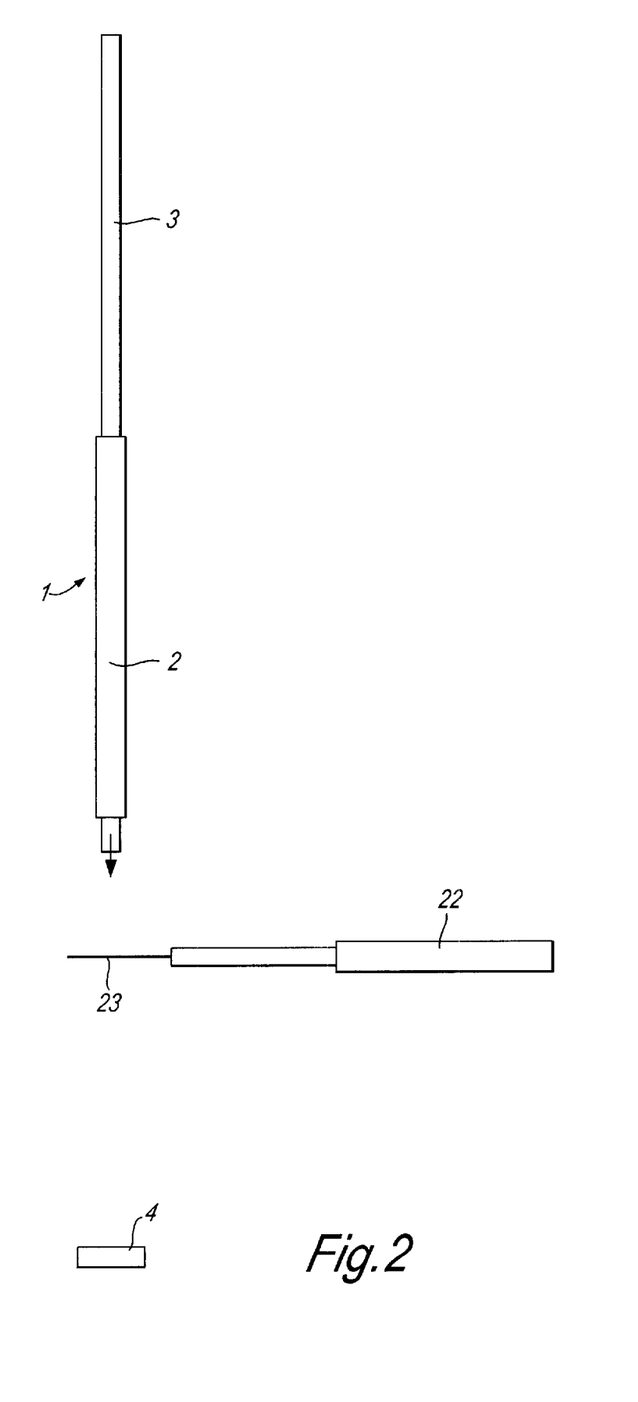
Figure 3:
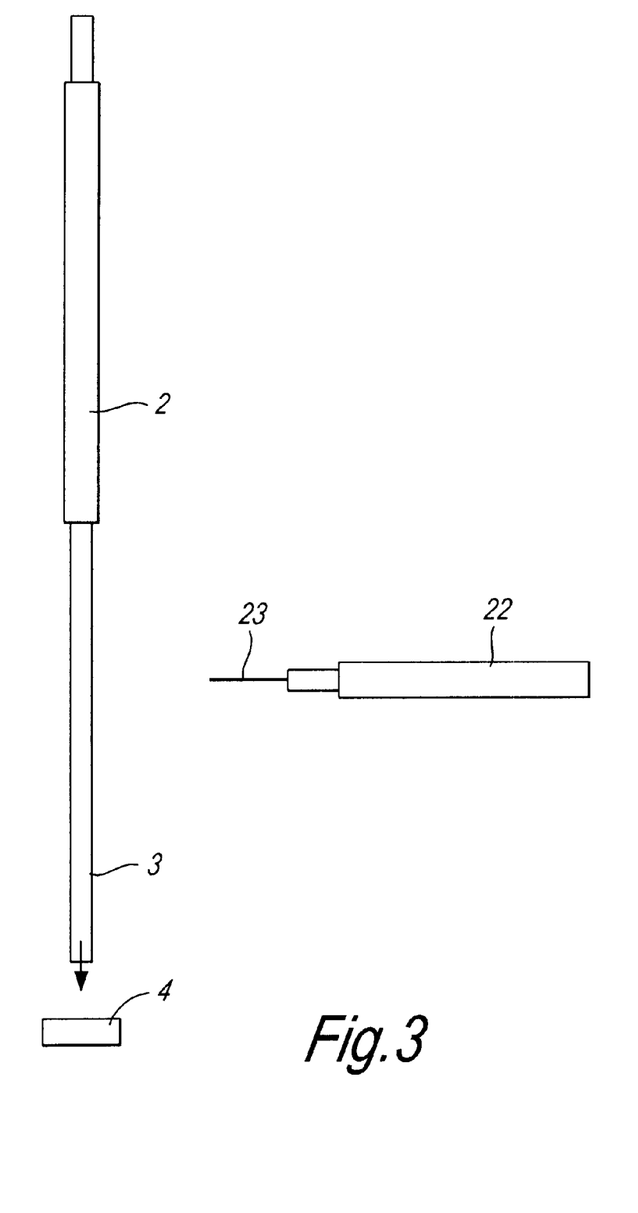

FIGS. 2 and 3 illustrate the use of a heat shield 23 to shield the target from the heat source. The shield is introduced by a shield cylinder 22 into position between the heat source and the target when the soldering device is in the Home position, as shown in FIG. 2. The shield can then be withdrawn in order to allow the device to enter the Work position, as shown in FIG. 3.

Figure 4:
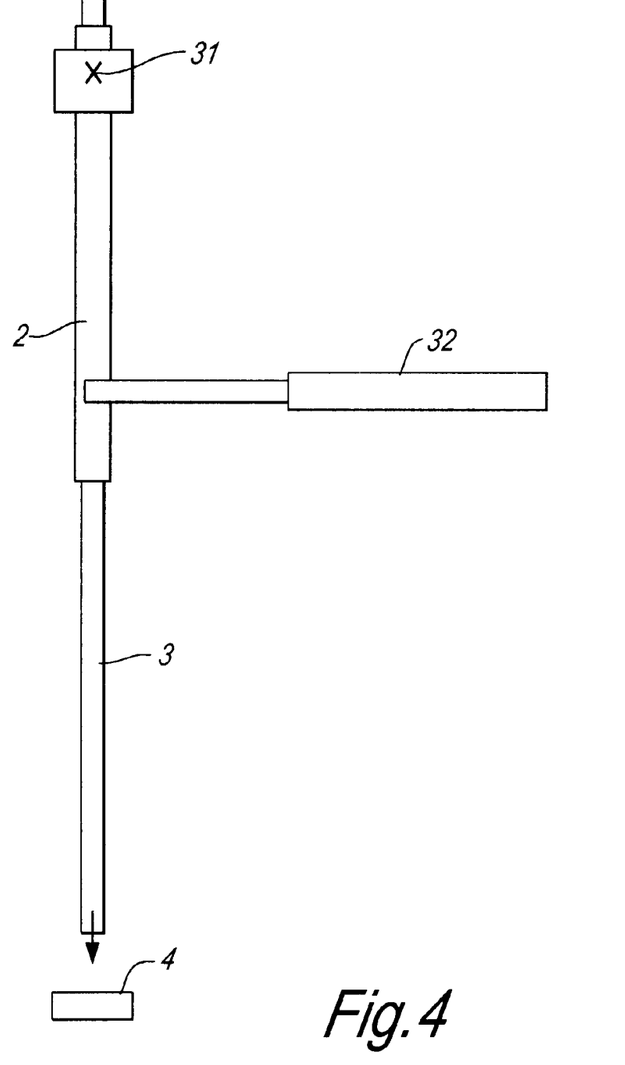
Figure 5:
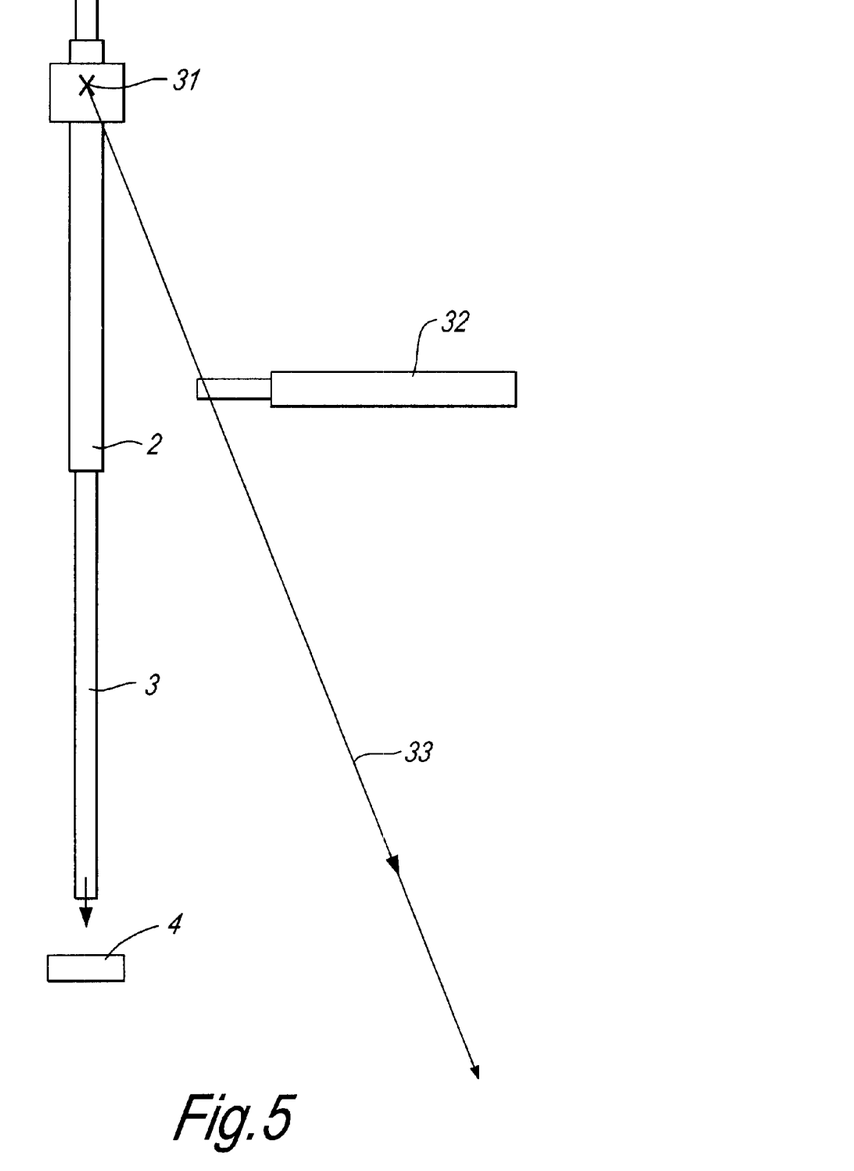

FIGS. 4 and 5 illustrate a soldering device comprising a flame cylinder 2 which is pivotable about a joint 31. The device can be pivoted between a Home position and a Work position by a pivot cylinder 32. The Work position is shown in FIG. 4, and FIG. 5 shows the pivot cylinder in the Home position, which moves the flame cylinder onto the axis illustrated by the arrow 33, thereby moving the heat source away from the target area. In the Home position, the heat source may be directed to a heat absorbing area.

Figures 6A, 6B:
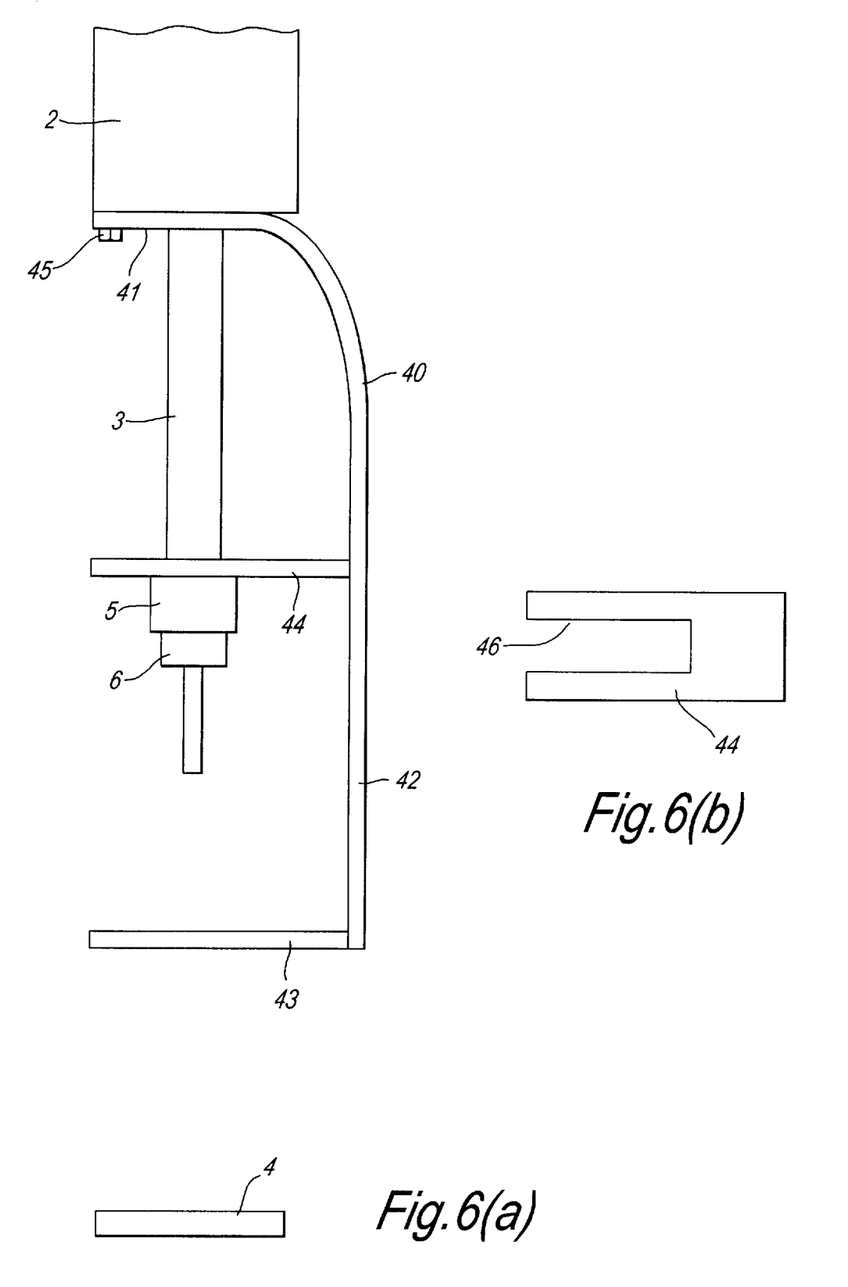
FIG. 6 shows a heat shield device according to a first embodiment of the invention in the standby or Home position, with the nozzle of the soldering device retracted.

A first embodiment of the invention is shown in FIG. 6. The heat shield device 40 comprises a flexible resilient band, preferably made of steel. An end portion 41 of the band is mounted horizontally on the lower portion of the flame cylinder 2 at a fixing point 45. The band is curved between the end portion 41 and a vertical portion 42 in such a way that the resilience of the band provides a biassing force on the vertical portion 42. The vertical portion 42 is held in the vertical position against the biassing force by a fixture in the form of a collar 5 on the stem 3 of the soldering device, abutting against a slotted fixing member 44 which extends horizontally from the vertical member 42. The fixing member 44 has a slot 46 as shown in plan view in FIG. 6(b), which accommodates the stem 3, but is narrower than the width of the fixture 5. A heat shield 43 extends horizontally from the lower end of the vertical portion 42, and shields the target area 4 from the flame emanating from the nozzle 6.

In this and other preferred embodiments, the heat source moves linearly towards and away from the target area, and in response to this motion the heat shield moves in an arcuate path out of and into the shielding position. Preferably, the arcuate path of the heat shield is such that the initial motion of the heat shield as it leaves the shielding position is in a direction perpendicular to the direction of motion of the heat source.

Figure 7:
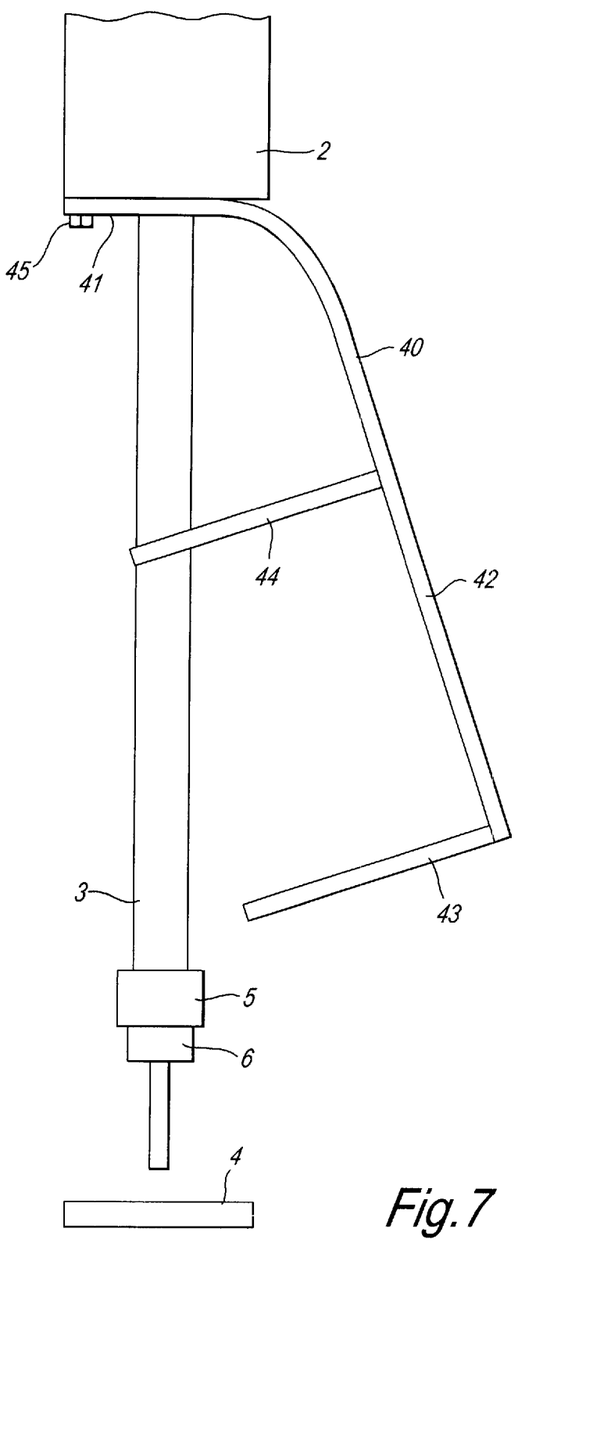
FIG. 7 shows the heat shield device of FIG. 7 in the Work position, with the nozzle extended.

In the arrangement shown in FIG. 6(a), the heat shield device is in the Home position. When the stem is moved downwards so that the nozzle 6 approaches the target area 4, the fixture 5 releases the fixing member 44, allowing the biassing force to move the vertical portion 42 away from its vertical position. As the nozzle is lowered, the heat shield 43 therefore moves out of the path of the nozzle, allowing the nozzle to pass towards the target area, until the Work position is reached, as shown in FIG. 7.

When the nozzle is raised once again into the Home position, the fixture 5 makes contact with the fixing member 44. The lower surface of member 44 slides over the upper surface of fixture 5 causing the vertical portion 42 to be pulled against the biassing force into its vertical position, thereby moving the heat shield 43 back into position between the nozzle and the target area. The function of the heat shield 43 is therefore automatically synchronized with the vertical motion of the heat source.

In the above description, the term "vertical" is intended to mean parallel to the direction of travel of the heat source, shown as a vertical direction in FIGS. 6 to 9. It will be appreciated that variations are possible, wherein the device is mounted in other orientations and the various other components of the device oriented accordingly.

Figure 8:
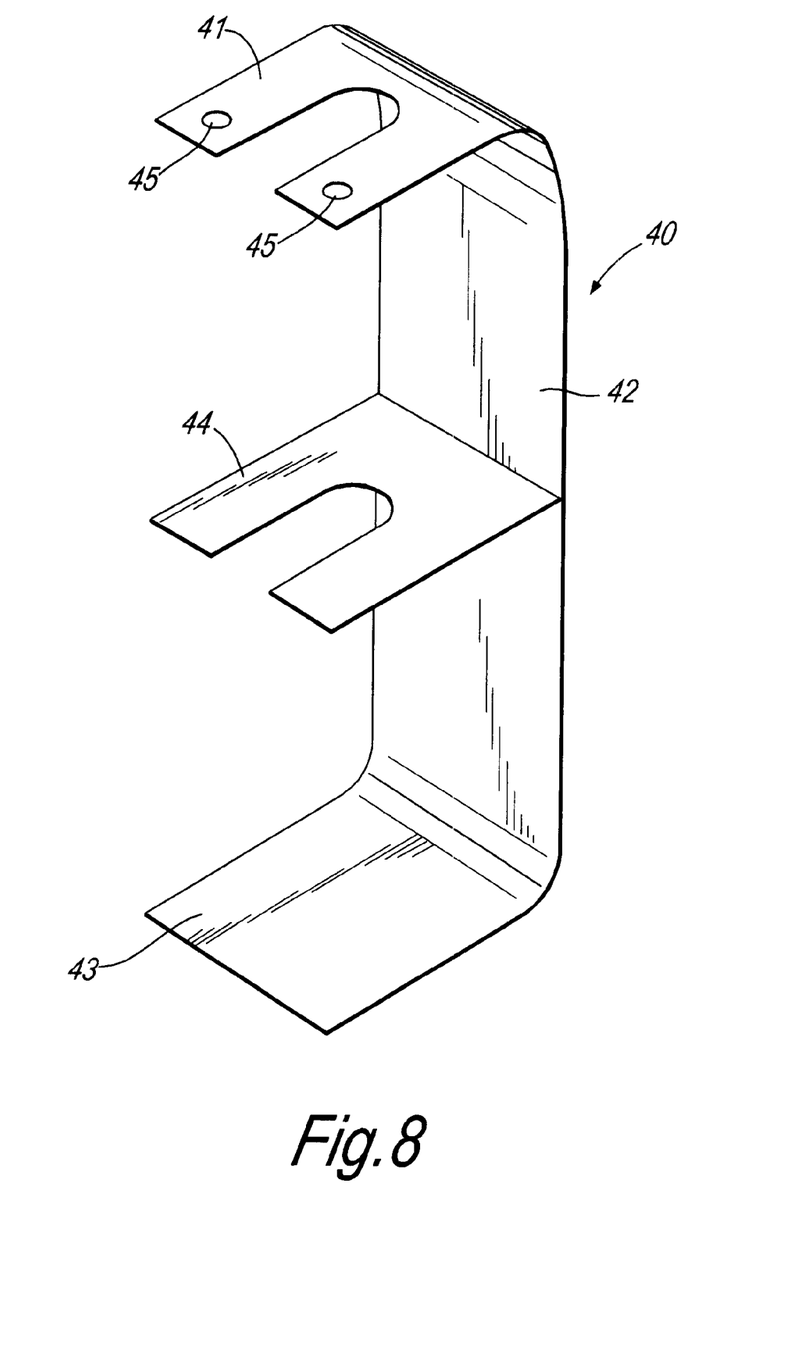
FIG. 8 shows the heat shield device of FIGS. 6 and 7 in perspective view.

FIG. 8 shows the heat shield device 40 on its own, and illustrates how the horizontal portion 41 can also be slotted in order to fit around the stem. Fixing points 45 are also shown.

Figure 9:
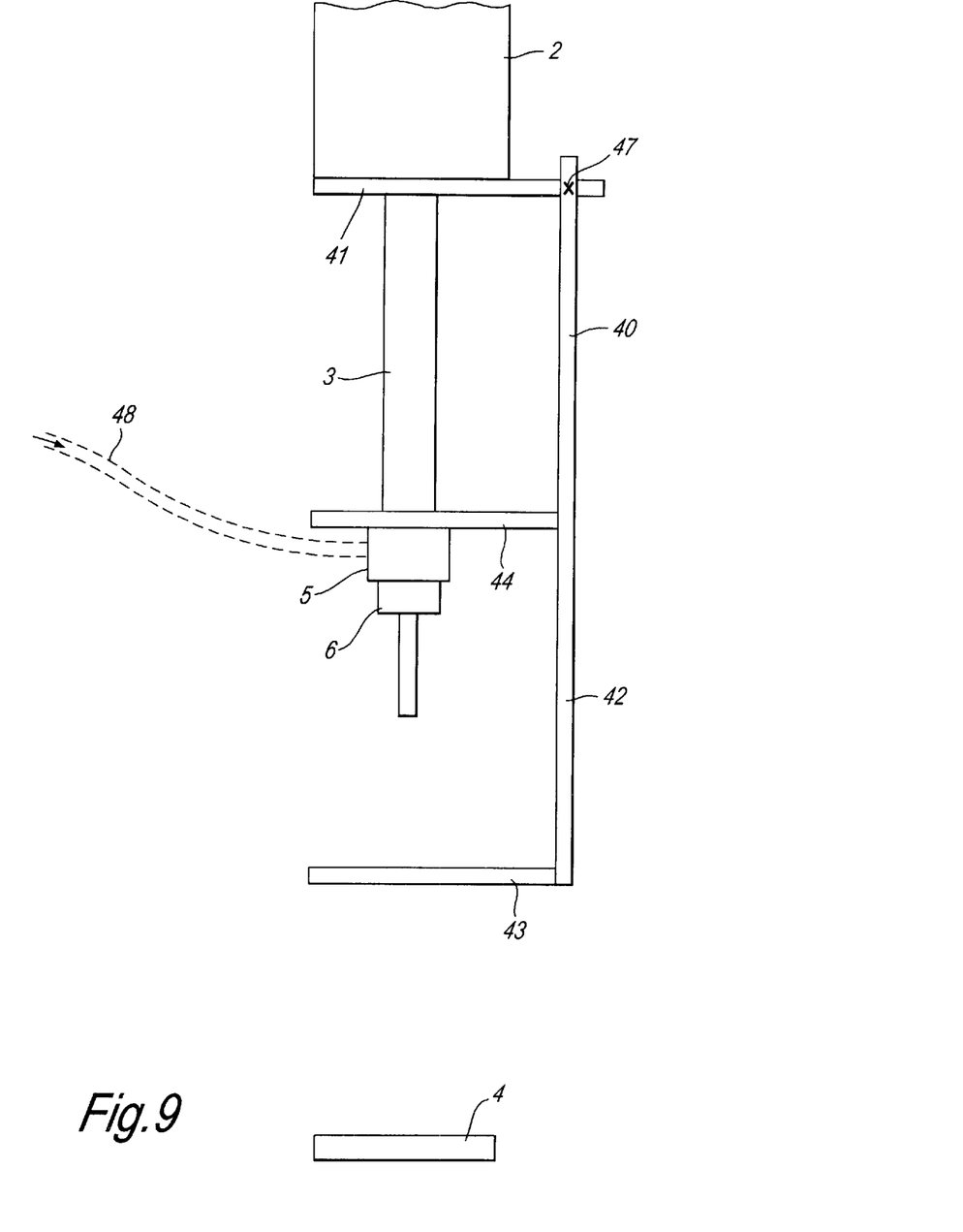
FIG. 9 shows a heat shield device according to a second embodiment of the invention, in a standby position.

Modifications of the various components of the illustrated heat shield device are possible. For example, FIG. 9 shows a second embodiment which is similar to the embodiment shown in FIG. 6, except that the horizontal end portion 41 is joined to the vertical portion 42 via a pivot 47, and the biassing force is provided by separate resilient means, for example a spiral spring (not shown). In this embodiment, therefore, the heat shield device need not be made from resilient material.

Furthermore, it is possible to use the heat shield device with a soldering device in which gas is supplied through a hollow stem of the device, as described previously, or alternatively the gas may be supplied through a separate tube 48 (shown dotted in FIG. 9) which is connected, for example, to the side of the fixture 5. In the latter case, in which the stem 3 is not required to supply the gas, the nozzle 6 may advantageously be mounted on a variety of different kinds of rod or other mounting, and the illustrated heat shield device may be readily adapted as appropriate.

It should be noted that in both embodiments of the invention, when the shield 43 is in the work position, the member 44 overhangs the fixture 5 to ensure contact between these two members when the stem 3 is moved upwardly, whilst the shield 43 is clear of the stem 3 and the fixture 5.

What is claimed is:

1. A heat delivery device having a heat source which is movable towards and away from a target area and a heat shield device, the heat shield device comprising a heat shield and means for moving the heat shield between a shielding position in which the heat shield is located between the target area and the heat source and a work position in which the heat shield does not shield the heat source, the heat shield device being mounted with respect to the heat source so that movement of the heat shield is mechanically linked to the movement of the heat source whereby as the heat source moves towards the target area the heat shield moves towards the work position and as the heat source moves away from the target area the heat shield moves towards the shielding position.

2. A heat delivery device as claimed in claim 1, in which the means for moving the heat shield include means for providing a biasing force.

3. A heat delivery device as claimed in claim 2, in which said biasing means bias the heat shield away from the shielding position.

4. A heat delivery device as claimed in claim 2 in which the means for providing a biasing force comprise a resilient member by which the heat shield may be secured with respect to the heat source.

5. A heat delivery device as claimed in claim 2, in which the heat shield is pivotably mountable with respect to the heat source and the pivoting action is influenced by spring means.

6. A heat delivery device as claimed in claim 1, in which the means for moving the heat shield comprise a cam surface which cooperates in use with a surface which moves with the heat source.

7. A heat delivery device as claimed in claim 6, in which said cooperating surfaces provide a camming action to move the heat shield into the shielding position.

8. A heat delivery device as claimed in claim 6 in which the cam surface comprises a shoulder fixed with respect to the heat source.

* * * * *